Sept. 20, 1960        C. A. DESOER        2,953,743

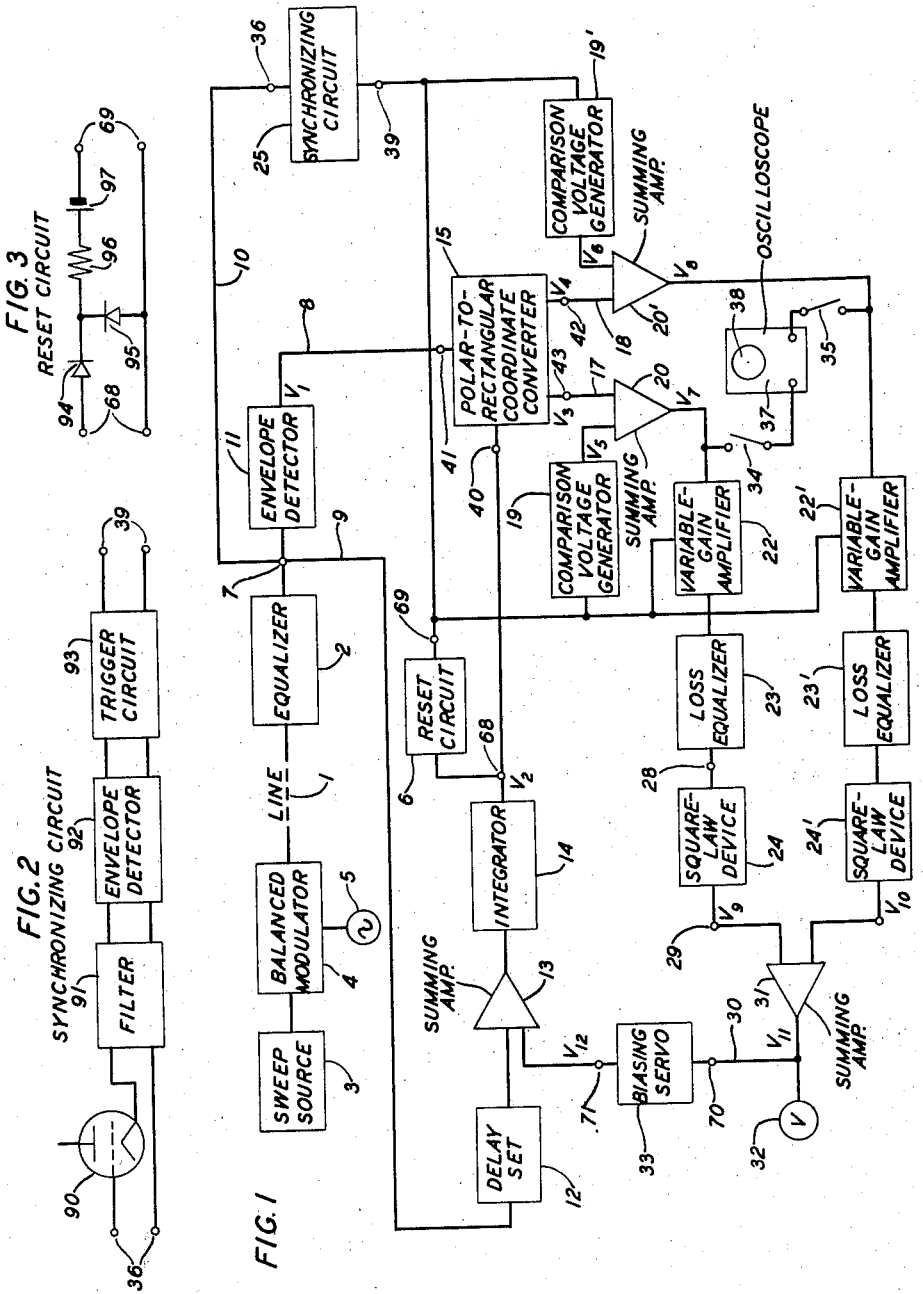

MEASUREMENT OF TRANSMISSION QUALITY

Filed Jan. 20, 1958        2 Sheets-Sheet 2

BIASING SERVO

POLAR-TO-RECTANGULAR
CO-ORDINATE CONVERTER

INVENTOR
C. A. DESOER
BY
Ralph T. Holcomb
ATTORNEY

2,953,743

MEASUREMENT OF TRANSMISSION QUALITY

Charles A. Desoer, Madison, N.J., assignor to Bell Telephone Laboratories, Incorporated, New York, N.Y., a corporation of New York Filed Jan. 20, 1958, Ser. No. 709,815

10 Claims. (Cl. 324—57)

This invention relates to electrical testing circuits and more particularly to the measurement of transmission quality.

An object of the invention is to obtain an indication of the quality of transmission in a wave transmission path. A related object is to determine if a transmission path is properly equalized with respect to both gain and delay. A further object is to obtain information for adjusting gain and delay equalizers associated with a transmission path.

Long, broad-band, wave transmission systems usually require adjustable equalizers to take care of variations in gain and delay due to aging, temperature changes, or other causes. In connection with such a system, it is desirable to have a testing circuit which will provide a measure of the quality of transmission as compared with a selected reference transmission characteristic. This reference characteristic is usually characterized by uniform gain and delay throughout the transmission band of interest. The circuit should provide an indication of when the equalizers are in optimum adjustment. It is also desirable to be able to weight the characteristic on the basis of frequency or time.

The quality-measuring circuit in accordance with the present invention meets these requirements. A single reading on a voltmeter gives a criterion of the quality of transmission with respect to a specified transmission characteristic. Also, a visual indication of the deviation may be displayed on an oscilloscope, if desired.

A periodic sweep source, a balanced modulator, and a beating oscillator provide a test voltage which is impressed upon one end of the transmission line under test. It will be assumed that the line includes an adjustable loss and delay equalizer. This voltage is the sum of two periodic, constant-amplitude, swept sine waves whose instantaneous frequencies have a constant difference.

The voltage received at the other end of the line is impressed upon three branches. One branch includes an envelope detector the output voltage $V_1$ of which is proportional to the amplitude of transmission of the path and the equalizer over the swept frequency range, on a time basis. A second branch includes a delay deviation set followed by an integrator the output voltage $V_2$ of which is proportional to the deviation from linearity of the phase shift in the line and the equalizer over the range, on the same time basis. The third branch includes a synchronizing circuit which generates a pulse at the end of each sweep of the test voltage. This pulse is applied through a reset circuit to reset $V_2$ to zero at the end of each sweep. The voltages $V_1$ and $V_2$ are impressed upon a converter which has the function of changing from polar to rectangular coordinates. This converter provides two output voltages $V_3$ and $V_4$ which are proportional, respectively, to the real part of the over-all transfer function of the line and the equalizer, and to the imaginary part except for a constant delay term. Comparison voltages, under the control of the synchronizing circuit, are subtracted, respectively, from the last-mentioned voltages. The remaining voltages are squared, summed, and smoothed to provide a mean-square error voltage which is read on a voltmeter.

This error voltage may also be applied to a feed-back path connected to the integrator. The feed-back path includes a biasing servo which, in effect, continually readjusts the reference linear phase characteristic to minimize the error voltage. The magnitude of the error voltage is a criterion of the quality of transmission of the line and equalizer under test. For the best equalization, and the best quality, the equalizer is adjusted to make the error voltage as small as possible. Also, a further criterion of the quality may be obtained by applying the two components $V_3$ and $V_4$ of the error voltage to an oscilloscope to produce a visual display. The transmission characteristic of the line may be weighted, if desired, by adding networks to one or both of the component error-voltage paths. For frequency weighting, a variable-gain amplifier, controlled by the synchronizing circuit, may be used. Echoes in the impulse response characteristic may be emphasized by employing a loss equalizer.

The nature of the invention and its various objects, features, and advantages will appear more fully in the following detailed description of a typical embodiment illustrated in the accompanying drawing, of which Fig. 1 is a single-line, schematic diagram, in block form, of a quality-measuring circuit in accordance with the invention;

Fig. 2 shows schematically a synchronizing circuit for use in Fig. 1;

Fig. 3 shows a reset circuit for use in Fig. 1;

Figure 7:
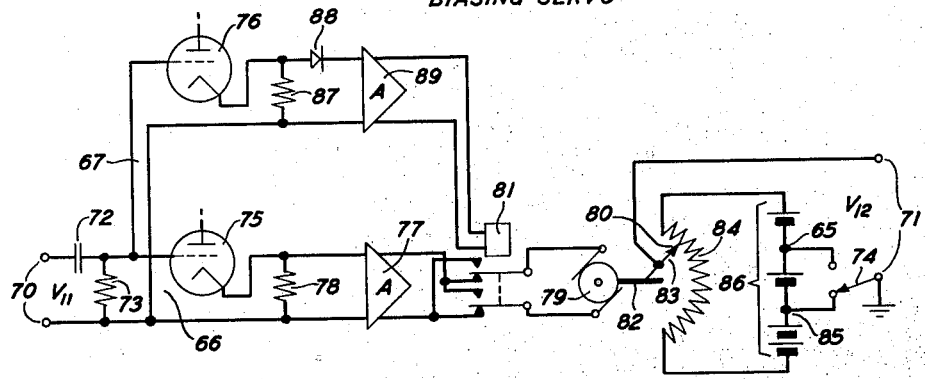
Fig. 7 is a schematic circuit of a biasing servo which may be used in Fig. 1.

In Fig. 1, the transmission line or path 1 under test is connected in tandem with an equalizer 2, which will ordinarily have a number of controls for adjusting the insertion loss and phase shift, either independently or in combination, over the frequency range of interest. The testing voltage impressed upon the left or input end of the line 1 is obtained from the transmitting portion of the measuring circuit comprising a sweep source 3, a balanced modulator 4, and a fixed oscillator 5. The source 3 generates a sinusoidal voltage wave of constant amplitude whose frequency increases with time periodically from the lowest frequency $f_1$ to the highest frequency $f_2$ of interest. As an example, the source 3 may sweep from 100 kilocycles to 8.6 megacycles in a period of one-tenth second. The frequency usually increases linearly with time, but may be given some other selected characteristic to introduce weighting. The modulator 4 changes the instantaneous frequency $f$ of the source 3 into a pair of frequencies having a constant spacing which depends upon the fixed frequency $f_A$ of the beating oscillator 5. These are the upper and lower sideband frequencies, $f+f_A$ and $f-f_A$. In the present example, $f_A$ may be four kilocycles. These two waves from the modulator 4 are transmitted through the line 1 and the equalizer 2 to the point 7 at the output end.

The receiving portion of the measuring circuit connected to the point 7, divides into three branches, 8, 9, and 10. The output $V_1$ of the envelope detector 11 in the path 8 is a direct voltage which is proportional to gain, and varies inversely with the insertion loss, in the line 1 and the equalizer 2. The path 9 includes a delay deviation set 12, a summing amplifier 13, and an integrator 14, all connected in tandem. The delay set 12 may, for example, be of the type shown in Fig. 14 of Patent 2,753,526, to R. W. Ketchledge, issued July 3, 1956. The output of the delay deviation set 12 is a direct voltage which is a measure of the deviation from a constant delay, corresponding to linear phase shift, of the test signals passing through the line 1 and the equalizer 2. This output passes through the summing amplifier 13 to the integrator 14, the output of which is a direct voltage $V_2$ proportional to the deviation from a reference linear phase shift in the line 1 and the equalizer 2. The branch 10 includes a synchronizing circuit 25, shown schematically in Fig. 2 and described more fully hereinafter, which generates a negative output pulse at the end of each sweep of the source 3. These pulses are fed to the reset circuit 6, shown in Fig. 3 and described below, which sets $V_2$ to zero at the end of each sweep of the source 3.

The voltages $V_1$ and $V_2$ are impressed upon the converter 15, which transforms from polar to rectangular coordinates. The converter 15, shown in Fig. 4 and described hereinafter, produces direct output voltages $V_3$ and $V_4$ which are proportional, respectively, to $V_1 \cos V_2$ and $V_1 \sin V_2$. These voltages represent, respectively, the real part and the imaginary part of the transfer function of the line 1 and the equalizer 2 under test.

The voltages $V_3$ and $V_4$ are impressed, respectively, upon the branches 17 and 18. The branch 17 includes a comparison voltage generator 19, a summing amplifier 20, a variable-gain amplifier 22, a loss equalizer 23, and a square-law device 24. Similar components, designated by the same reference numbers primed, are found in the branch 18.

Figure 6:
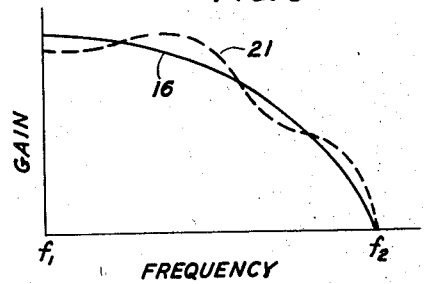
Fig. 6 shows comparative gain versus frequency characteristics.

The generators 19 and 19' supply repetitive, direct voltages $V_5$ and $V_6$, respectively. With the aid of the periodic pulses from the circuit 25, these voltages are synchronized with the period of the sweep source 3. The voltages $V_3$ and $V_5$ are summed in the amplifier 20 to produce the real-part error voltage $V_7$, and $V_4$ and $V_6$ are added in the amplifier 20' to give the imaginary-part error voltage $V_8$. It is usually desired that the overall gain in the line 1 and the equalizer 2 be constant and the phase shift linear over the frequency range of interest, as shown by the solid-line curve 62 in Fig. 5. Under these circumstances, $V_1$ and $V_3$ should be constant and $V_2$ and $V_4$ zero. In this case, $V_5$ is made equal to $-V_3$ and $V_6$ is made zero. However, some other type of gain characteristic may be desired. The solid-line curve 16 in Fig. 6 shows, for example, a characteristic which decreases with frequency. The broken-line curve 21 shows the actual gain which might be obtained with a given adjustment of the equalizer 2. Any attainable type of transmission characteristic may be provided by proper choices of the comparison voltages $V_5$ and $V_6$. It is apparent, however, that the error voltages $V_7$ and $V_8$ will each be zero, or at least a minimum, when the equalizer 2 is in optimum adjustment.

In the branch 17, the amplifier 22 provides a variable gain synchronized with the period of the sweep source 3 by means of the pulses from the circuit 25. The gain is increased in the portion of the sweep where it is desired to emphasize or weight the real-part error voltage $V_7$. The loss equalizer 23 operates in the frequency range of the error signal voltage $V_7$, which in the present example may extend from zero to 2 kilocycles. The equalizer characteristic may be shaped to weight any selected echoes associated with the transient response of the line 1. The device 24 functions to square the input voltage impressed thereon. A suitable square-law device is described in an article by E. J. Angelo, Jr., entitled "An Electron Beam Tube for Analog Multiplication," published in the Review of Scientific Instruments, vol. 25, March 1954, pages 280 to 284. The devices 22', 23', and 24' in the branch 18 operate in a similar manner upon the imaginary-part error voltage $V_8$. If their weighting functions are not required, any or all of the devices 22, 22', 23, and 23' may be omitted.

The output voltages $V_9$ and $V_{10}$ from the square-law devices 24 and 24' are summed in the amplifier 31 to produce a direct voltage $V_{11}$ which may be read on the voltmeter 32. The amplifier 31 preferably passes only a very narrow band, say from zero to one cycle, and thus smooths the voltage $V_{11}$ by suppressing any ripples. The magnitude of the voltage $V_{11}$, which is the average of the sum of $V_9$ and $V_{10}$, is thus a measure of the transmission quality of the line 1 under test and its associated equalizer 2. However, the magnitude of $V_2$, and therefore $V_{11}$, depends upon the slope of the reference linear phase shift employed when the integrator 14 produces the deviation voltage $V_2$. In order to minimize $V_{11}$, it is applied to a feed-back path 30. This path includes a servo 33, shown in Fig. 7 and described below, which provides a biasing voltage $V_{12}$. This voltage, in turn, is applied to the summing amplifier 13, which feeds the integrator 14.

Useful information with respect to the transmission quality of the path under test may sometimes be obtained by displaying the deviation voltages on an oscilloscope. As shown in Fig. 1, the error voltage $V_7$ may be applied through a switch 34, and the voltage $V_8$ through a switch 35, to an oscilloscope 37. Preferably, $V_7$ is connected to the horizontal plates and $V_8$ to the vertical plates of the oscilloscope 37. The screen 38 will then display the error in polar form. The pattern will be a dot if the equalizer 2 is perfectly adjusted. When the oscilloscope 37 is not in use, it is preferably disconnected from the branches 17 and 18 by throwing the switches 34 and 35 to the open position shown.

The components 6, 15, and 25 will now be described in greater detail. A suitable synchronizing circuit 25 is shown schematically in Fig. 2, where the pairs of terminals 36 and 39 correspond to the single terminals of like number in Fig. 1. The circuit comprises a cathode follower 90, a wave filter 91, an envelope detector 92, and a trigger circuit 93 connected in tandem. The function of the cathode follower 90 is to prevent interaction between the branch 10 and the other circuits connected at the junction point 7. The filter 91 passes a narrow band centered near the frequency $f_2$ at the upper end of the sweep range of the source 3. Thus, a voltage will appear at the output end of the filter 91 only when the multifrequency swept sine waves from the modulator 4 reach their highest frequency. The voltage from the filter 91 is detected by the envelope detector 92 and the resulting positive waveform is applied to the trigger circuit 93. The latter may, for example, comprise a monostable blocking oscillator such as is shown in Figs. 9–27 on page 283 of the book entitled "Pulse and Digital Circuits," by J. Millman and H. Taub, published by McGraw-Hill Book Company, Inc., New York, 1956. For this particular application, the negative output pulse may be obtained from a third winding added to the transformer shown in that figure. These negative pulses appearing at the output terminals 39 at the end of each sweep period are used to synchronize the reset circuit 6, the comparison voltage generators 19, 19', and the variable-gain amplifiers 22, 22' with the sweep source 3.

The reset circuit 6 is shown schematically in Fig. 3, where the pairs of terminals 68 and 69 correspond to the single terminals with the same numbers in Fig. 1. The terminals 68 are also the output terminals of the integrator 14. The reset circuit 6 comprises two rectifiers 94, 95, a resistor 96, and a battery 97. The rectifiers 94 and 95, which may be of the semiconductor type, are connected in series across the output terminals 68. The battery 97, connected through the resistor 96 to the common terminal of the rectifiers, provides a reverse bias which makes the impedance across the terminals 68 very high. However, a negative pulse from the synchronizing circuit 25 reaching the terminals 69 overcomes the effect of the battery 97 and provides a forward bias on both of the rectifiers 94 and 95. As a result, the impedance across the terminals 68 falls to a very low value and the output voltage $V_2$ from the integrator 14 is reduced substantially to zero at the end of each sweep of the source 3.

Figure 4:
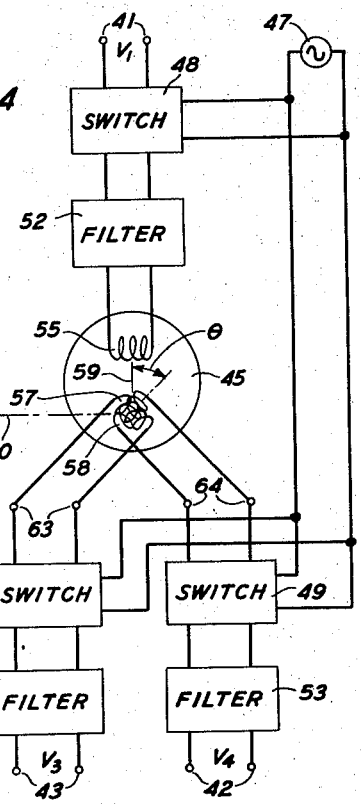
Fig. 4 shows schematically a suitable polar-to-rectangular coordinate converter for use in Fig. 1.

A suitable circuit for the polar-to-rectangular coordinate converter 15 is shown schematically in Fig. 4. The pairs of terminals 40, 41, 42, and 43 correspond to the single terminals similarly numbered in Fig. 1. The converter 15 comprises a resolver 45, a position servo 46, an oscillator 47, three switches 48, 49, 50, and three filters 52, 53, 54. The function of the switches 48, 49, and 50 is to reverse periodically the polarity of the transmitted signal, at a rate determined by the fixed frequency $f_0$ of the oscillator 47. Each of these switches may, for example, be of the type shown in Fig. 3 of Patent 2,805,021, to E. S. Weibel, issued September 3, 1957, comprising a bridge made up of four copper-oxide rectifiers.

The output voltage $V_1$ of the envelope detector 11 (Fig. 1) is a smoothly varying signal which represents, as a function of time, the gain of the line 1 and equalizer 2 over the band of interest from $f_1$ to $f_2$. This voltage $V_1$ is impressed upon the terminals 41 of the converter, has its polarity reversed periodically by the switch 48, is filtered in the filter 52, and is then impressed upon the stator winding 55 of the resolver 45 in the form of a sinusoidal signal. The frequency $f_0$ is preferably equal to at least twice the highest component of $V_1$. In the present example, $f_0$ may be chosen as 5000 cycles per second. The filter 52 has a band-pass characteristic which passes only the fundamental frequency $f_0$ and its side bands. In the present example, the band may extend from 3000 to 7000 cycles per second.

Figure 5:
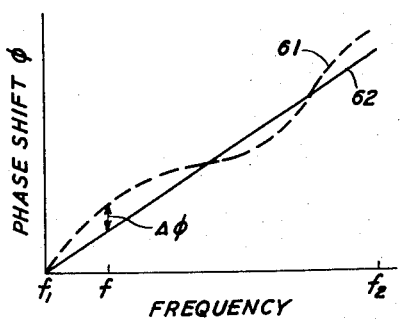
Fig. 5 shows comparative phase shift versus frequency characteristics.

The resolver 45 has four ports, or pairs of terminals. The two windings 57 and 58, associated with the rotor, have their axes positioned at right angles to each other. The angle $\theta$ between the axis of the winding 58 and a line 59 perpendicular to the axis of the stator winding 55 is controlled by the shaft 60 of the position servo 46. The output voltage $V_2$ from the integrator 14 (Fig. 1) is impressed on the input terminals 40 of the servo 46. At any given time, corresponding to a frequency $f$, $V_2$ is proportional to $\Delta\Phi$. As shown in Fig. 5, $\Delta\Phi$ is the difference between the over-all phase shift in the line 1 and the equalizer 2, represented by the broken-line curve 61, and the reference linear phase shift, shown by the solid-line curve 62. The shaft 60 is so geared that $\theta$ is equal to $\Delta\Phi$. The resolver 45 has the property that a sinusoidal signal voltage of amplitude $A$ impressed on the stator winding 55 is resolved into two sinusoidal components. The magnitudes of these components are, respectively, $A \cos \Delta\Phi$ and $A \sin \Delta\Phi$. The first appears at the terminals 63 and the second at the terminals 64. One of these components is demodulated in the switch 50 and smoothed in the low-pass filter 54. The other is demodulated in the switch 49 and smoothed in the low-pass filter 53. The switches 49 and 50 are identical with the switch 48 and are driven from the same oscillator 47. In the present example, the filters 53 and 54 may cut off at 2000 cycles per second. Thus, the direct voltage $V_3$ appearing at the terminal 43 represents the real part of the transfer function of the line 1 and equalizer 2, and the voltage $V_4$ at the terminals 42 represents the imaginary part except for a constant delay term.

A suitable circuit for the biasing servo 33 is shown schematically in Fig. 7, where the input terminals 70 and the output terminals 71 correspond to the similarly numbered terminals in Fig. 1. The magnitude of the voltage $V_{11}$, representing the weighted mean-square error, depends upon the slope of the reference phase characteristic 62 (Fig. 5). The function of the servo 33 is, in effect, to choose this slope so as to minimize $V_{11}$. This is done by developing at the output terminals 71 a direct voltage $V_{12}$ of the proper magnitude and sign to apply as a bias through the amplifier 13 to the integrator 14.

To accomplish this, $V_{11}$ is applied to the input terminals 70 of the servo 33 and differentiated with respect to time in the network comprising the series capacitor 72 and the shunt resistor 73. The resulting voltage is fed to the grids of the cathode followers 75 and 76, in the main path 66 and the auxiliary path 67, respectively. The cathode follower 75 is coupled to the direct-current amplifier 77 by the shunt resistor 78. The output current of the amplifier 77 is fed to a direct-current motor 79 through the contacts of a polarized relay 81, causing the shaft 82 to turn. The shaft 82 operates a wiper 83 which connects the upper output terminal 71 to an adjustable point 80 on the potentiometer 84. A battery 86 supplies the voltage drop across the potentiometer 84. The grounded output terminal 71 is connected to a two-position switch 74 which completes a connection to battery 86 either at the center 85 or at a point 65 off center.

To start the quality-measuring circuit operating, the wiper 83 is set at the center of the potentiometer 84, the switch 74 is thrown to its normal, lower position to connect the lower terminal 71 to the center 85 of the battery 86, and the sweep source 3 (Fig. 1) is started. If the transmission through the line 1 and the equalizer 2 is stabilized, the voltage $V_{12}$ will remain zero and the biasing servo 33 will be inactive and unable to perform its function of minimizing $V_{11}$. In order to activate the servo 33, the switch 74 is momentarily thrown to the up position, thus connecting the off-center point 65 of the battery 86 to the lower terminal 71 and providing a direct output voltage $V_{12}$, which may be either positive or negative. This biasing voltage, applied to the integrator 14 through the summing amplifier 13, changes the slope of the reference phase shift line 62 and either increases or decreases the error voltage $V_{11}$. With the servo 33 thus operating, the switch 74 is returned to its lower position.

Under these conditions, if $V_{11}$ increases, the system is unstable and $V_{11}$ will continue to increase faster and faster. The auxiliary path 67 is provided to avoid this situation. When the voltage across the resistor 87 reaches a preselected value, the semi-conductor diode 88 breaks down, thus applying the voltage to the amplifier 89. This sudden application of voltage to the amplifier 89 causes the relay 81 to operate, thus reversing the polarity of the voltage applied to the motor 79 and reversing the wiper 83. The wiper 83 now moves in the proper direction to minimize the error voltage $V_{11}$.

It is a simple matter to find the proper setting for the equalizer 2 with the aid of the measuring circuit shown in Fig. 1. Each of the variable gain and delay controls associated with the equalizer 2 is adjusted, in turn, to minimize the mean-square error voltage $V_{11}$ read on the voltmeter 32. Since $V_{11}$ represents, in effect, the error in both gain and delay integrated over the entire frequency range of interest, only a single or a very few adjustments of each equalizer control are required, unless the transmission changes. Therefore, the time and skill required to line up a transmission channel are greatly reduced.

It is to be understood that the above-described arrangement is only illustrative of the application of the principles of the invention. Numerous other arrangements may be devised by those skilled in the art without departing from the spirit and scope of the invention.

What is claimed is:

1. A system for measuring the quality of transmission over a range of frequencies in a transmission path comprising a converter, means connected to the converter, for obtaining a voltage $V_1$ proportional to the amplitude of transmission in the path over the range on a time basis, means connected to the converter for obtaining a voltage $V_2$ proportional to the deviation from linearity of the phase shift in the path over the range on the same time basis, the converter being adapted to produce a voltage $V_3$ equal to $V_1 \cos V_2$ and a voltage $V_4$ equal to $V_1 \sin V_2$, means connected to the converter for subtracting a predetermined reference voltage from $V_3$ to obtain a voltage $V_7$, means connected to the converter for subtracting another predetermined reference voltage from $V_4$ to obtain a voltage $V_8$, means connected to the subtracting means for squaring $V_7$ and $V_8$, and means connected to the squaring means for summing the squared voltages to obtain a voltage $V_{11}$ which is an index of the quality of transmission in the path compared to the desired transmission as represented by the reference voltages.

2. A system in accordance with claim 1 which includes an oscilloscope having two pairs of plates and means for impressing the voltages $V_7$ and $V_8$, respectively, upon the pairs of plates.

3. A system in accordance with claim 1 which includes a feed-back path between the summing means and the means for obtaining $V_2$ comprising a biasing servo adapted to minimize $V_{11}$.

4. A system for obtaining a criterion of the transmission quality in a transmission path over a frequency range comprising a converter, means connected to the converter for obtaining a voltage $V_1$ proportional to the gain in the path over the range on a time basis, means connected to the converter for obtaining a voltage $V_2$ proportional to the deviation of the phase shift in the path from a reference linear phase shift over the range on the same time basis, the converter being adapted to produce a voltage $V_3$ equal to $V_1 \cos V_2$ and a voltage $V_4$ equal to $V_1 \sin V_2$, means connected to the converter for subtracting a predetermined reference voltage from $V_3$ to obtain a voltage $V_7$, means connected to the converter for subtracting another predetermined reference voltage from $V_4$ to obtain a voltage $V_8$, a summing amplifier, separate paths for impressing $V_7$ and $V_8$ upon the amplifier, a square-law device in each of the paths, a variable-gain amplifier connected in one of the paths for weighting the error voltage appearing at the output of the amplifier, and means for synchronizing the amplifier with the time basis.

5. A system for obtaining a criterion of the transmission quality in a transmission path over a frequency range comprising a converter, means connected to the converter for obtaining a voltage $V_1$ proportional to the gain in the path over the range on a time basis, means connected to the converter for obtaining a voltage $V_2$ proportional to the deviation of the phase shift in the path from a reference linear phase shift over the range on the same time basis, the converter being adapted to produce a voltage $V_3$ equal to $V_1 \cos V_2$ and a voltage $V_4$ equal to $V_1 \sin V_2$, means connected to the converter for subtracting a predetermined reference voltage from $V_3$ to obtain a voltage $V_7$, means connected to the converter for subtracting another predetermined reference voltage from $V_4$ to obtain a voltage $V_8$, a summing amplifier, separate paths for impressing $V_7$ and $V_8$ upon the amplifier, a square-law device in each of the paths, and an insertion loss equalizer connected in one of the paths for weighting the error voltage appearing at the output of the amplifier.

6. A system for measuring the transmission quality of a wave transmission path over a frequency range comprising means for generating and impressing a test signal upon one end of the path, the signal including two constant-amplitude, sinusoidal waves which have a constant frequency difference and repetitively sweep the range in a selected period of time, and a receiving circuit at the other end of the path comprising a converter, means for deriving voltages $V_1$ and $V_2$ from the received test signal, $V_1$ being proportional to the amplitude of transmission in the path and $V_2$ being proportional to the deviation from linearity of the phase shift in the path, means for impressing $V_1$ and $V_2$ upon the converter, the converter being adapted to produce a voltage $V_3$ equal to $V_1 \cos V_2$ and a voltage $V_4$ equal to $V_1 \sin V_2$, means including a synchronizing circuit for periodically resetting $V_2$ to zero at the end of each of the periods, means including the synchronizing circuit for generating two periodic comparison voltages $V_5$ and $V_6$ synchronized with the periods, means connected to the converter for subtracting $V_5$ from $V_3$ to obtain a voltage $V_7$, means connected to the converter for subtracting $V_6$ from $V_4$ to obtain a voltage $V_8$, means connected to the subtracting means for squaring $V_7$ and $V_8$, means connected to the squaring means for summing the squared voltages to obtain a voltage $V_{11}$ which is an index of the quality of transmission in the path compared to the desired transmission as reperesented by $V_5$ and $V_6$, and a feed-back path between the summing means and the means for deriving $V_2$ including a biasing servo adapted to minimize $V_{11}$.

7. A testing circuit for obtaining a voltage $V_{11}$ indicative of the transmission quality of a wave transmission path over a frequency range comprising a converter means connected to the converter for obtaining a voltage $V_1$ proportional to the amplitude of transmission in the path over the range on a time basis, means connected to the converter for obtaining a voltage $V_2$ proportional to the deviation from linearity of the phase shift in the path over the range on the same time basis, means including a synchronizing circuit for periodically resetting $V_2$ to zero at intervals synchronized with the time basis, the converter being adapted to produce a voltage $V_3$ equal to $V_1 \cos V_2$ and a voltage $V_4$ equal to $V_1 \sin V_2$, means connected to the converter including a first comparison voltage generator for subtracting a predetermined reference voltage from $V_3$ to obtain a voltage $V_7$, means connected to the converter including a second comparison voltage generator for subtracting another predetermined reference voltage from $V_4$ to obtain a voltage $V_8$, connections from the synchronizing circuit to the generators, respectively, for synchronizing the reference voltages with the time basis, means connected to the subtracting means for squaring $V_7$ and $V_8$, and means connected to the squaring means for summing the squared voltages to obtain $V_{11}$.

8. In a wave transmission system comprising a transmission path and an associated equalizer for the path, a circuit for measuring the transmission quality of the system comprising a transmitting portion connected to the input end of the system and a receiving portion connected to the output end of the system, the transmitting portion including a source of two constant-amplitude, sinusoidal voltages with a fixed frequency spacing which periodically sweep over the frequency range of interest, the receiving portion including a converter with four ports for changing from polar to rectangular coordinates, a first transmission path and a second transmission path from the system to two of the ports, respectively, an envelope detector in the first path and a delay deviation set, an integrator, and an interposed first summing amplifier in the second path, a second summing amplifier, a third transmission path and a fourth transmission path from the second summing amplifier to the other two ports, respectively, each of the third and fourth paths including an additional summing amplifier, an associated comparison voltage generator, and a square-law device, and a biasing servo connected in a feed-back path from the output of the second summing amplifier to the first summing amplifier, the magnitude of the output voltage of the second summing amplifier providing a measure of the transmission quality of the system with respect to the characteristics of the comparison voltage generators.

9. A measuring circuit in accordance with claim 8 in which the third path includes a variable-gain amplifier, synchronized with the voltage source in the transmitting portion, for weighting the output voltage of the second summing amplifier on a frequency basis.

10. A measuring circuit in accordance with claim 8 in which the third path includes a loss equalizer for weighting the output voltage of the second summing amplifier with respect to the effect of echoes associated with the response of the system to an impulse.

References Cited in the file of this patent

UNITED STATES PATENTS

| | | |
|---|---|---|
| 2,617,855 | Etheridge | Nov. 11, 1952 |
| 2,746,015 | Alsberg | May 15, 1956 |
| 2,751,429 | Schlesinger | June 19, 1956 |
| 2,753,526 | Ketchledge | July 3, 1956 |
| 2,812,492 | Pfleger | Nov. 5, 1957 |